US011059959B2

(12) United States Patent
Cho et al.

(10) Patent No.: US 11,059,959 B2
(45) Date of Patent: Jul. 13, 2021

(54) TIRE INCLUDING RFID SYSTEM

(71) Applicant: HANKOOK TIRE CO., LTD., Seoul (KR)

(72) Inventors: Im Jun Cho, Cheongju-si (KR); Kyung Shin Min, Daejeon (KR)

(73) Assignee: HANKOOK TIRE CO., LTD.

( * ) Notice: Subject to any disclaimer, the term of this patent is extended or adjusted under 35 U.S.C. 154(b) by 127 days.

(21) Appl. No.: 16/196,637

(22) Filed: Nov. 20, 2018

(65) Prior Publication Data
US 2019/0300680 A1 Oct. 3, 2019

(30) Foreign Application Priority Data

Apr. 3, 2018 (KR) .......................... 10-2018-0038541

(51) Int. Cl.
| | |
|---|---|
| *C08L 7/00* | (2006.01) |
| *C08K 3/38* | (2006.01) |
| *C08K 3/04* | (2006.01) |
| *B60C 1/00* | (2006.01) |
| *B60C 19/00* | (2006.01) |
| *B60C 15/06* | (2006.01) |

(52) U.S. Cl.
CPC ................... *C08L 7/00* (2013.01); *B60C 1/00* (2013.01); *B60C 15/0607* (2013.01); *B60C 15/0635* (2013.01); *B60C 19/00* (2013.01); *C08K 3/04* (2013.01); *C08K 3/38* (2013.01); *B60C 2001/005* (2013.01); *B60C 2015/0614* (2013.01); *B60C 2019/004* (2013.01); *C08K 2003/385* (2013.01); *C08K 2201/014* (2013.01)

(58) Field of Classification Search
CPC ................................................ B60C 2019/004
See application file for complete search history.

(56) References Cited

U.S. PATENT DOCUMENTS

| | | | |
|---|---|---|---|
| 5,971,046 | A | 10/1999 | Koch |
| 2010/0000650 | A1 | 1/2010 | Matthiesen et al. |
| 2011/0175778 | A1 | 7/2011 | Myatt |
| 2016/0152793 | A1* | 6/2016 | Velamakanni ........... C08K 3/38 524/701 |

(Continued)

FOREIGN PATENT DOCUMENTS

| | | |
|---|---|---|
| CN | 101875562 A | 11/2010 |
| CN | 102054195 B | 4/2013 |
| CN | 105924704 A | 9/2016 |

(Continued)

*Primary Examiner* — Ian A Rummel
(74) *Attorney, Agent, or Firm* — Renaissance IP Law Group LLP

(57) ABSTRACT

A tire includes a radio frequency identification (RFID) system and a rubber patch including a topping rubber topping the RFID system, wherein the topping rubber includes a raw material rubber and a reinforcing filler including a boron nitride. In the tire including a RFID system, since the RFID system is covered with a rubber similar to a nearby rubber, generation of a boundary therebetween is suppressed to lower a possibility of the occurrence of initial cracking at a portion where the RFID system is applied, thus increasing durability and safety, and since insulating properties of the rubber covering the RFID system are enhanced, a recognition distance of the RFID system is increased to further facilitate management of distribution and history.

3 Claims, 3 Drawing Sheets

(56) References Cited

U.S. PATENT DOCUMENTS

2017/0368875 A1* 12/2017 Balnis ...................... C08L 7/00

FOREIGN PATENT DOCUMENTS

| | | | |
|---|---|---|---|
| JP | 2000247109 A | 9/2000 | |
| JP | 2007230261 A | 9/2007 | |
| JP | 2014214206 A | 11/2014 | |
| JP | 2017222294 A | 12/2017 | |
| JP | 2017537013 A | 12/2017 | |
| JP | 2018500451 A | 1/2018 | |
| JP | 2018502194 A | 1/2018 | |
| JP | 2018503715 A | 2/2018 | |
| KR | 20100120505 A | 11/2010 | |
| WO | 2016021327 A1 | 2/2016 | |
| WO | 2016105938 A1 | 6/2016 | |
| WO | 2019054226 A1 | 3/2019 | |

* cited by examiner

TIRE INCLUDING RFID SYSTEM

CROSS-REFERENCE TO RELATED APPLICATION

This patent application claims the benefit of priority under 35 U.S.C. 119 of Korean Patent Application No. 10-2018-0038541, filed on Apr. 3, 2018, the contents of which are hereby incorporated by reference for all purposes as if fully set forth herein.

BACKGROUND

1. Field

The present disclosure relates to a tire including a radio frequency identification (RFID) system, and more particularly, to a tire including a RFID system in which the RFID system is covered with a rubber similar to a nearby rubber to suppress generation of a boundary therebetween to thereby lower a possibility of the occurrence of initial cracking at a portion where the RFID system is applied, increasing durability and safety, and insulating properties of the rubber covering the RFID system are enhanced to increase a recognition distance of the RFID system to further facilitate management of distribution and history.

2. Description of Related Art

Radio frequency identification (RFID), as a system for identifying an identification (ID) using a frequency, refers to a technology for recognizing information from a far distance using radio waves.

Such an RFID technology is extensively used to record and recognize personal information, as well as to measure record and track production history of products, record a larger amount of information, compared with a barcode system, and give a serial number to each product.

Due to these characteristics, recently, there is a demand, in the tire industry, for applying an RFID tag to the inside of tires so that logistics and history of tires may be managed in manufacturing and transportation stages of vehicles. In addition, application of RFID tags to the inside of tires obtains a 100% of recognition rate, and as a recognition distance is increased, management of logistics and history of tires may be more advantageous, and thus, studies for increasing a recognition rate and a recognition distance of RFID tags have actively been conducted.

The recognition rate of an RFID tag depends on whether a chip, which is a core component of the RFID tag, may be properly protected, and the recognition distance may be enhanced by ensuring shielding and insulating properties against moisture and a metal component, as well as a length of an antenna.

In this connection, there has been an attempt to cover and protect both sides of an RFID tag with rubber and to obtain shielding and insulation effects. A rubber composition used herein includes unsaturated rubber (BR, IR, NR, SBR, etc.) and silica. Such a rubber composition has a high dynamic modulus and low permittivity, having an advantage that it may obtain an effect of protecting the RFID tag. However, application of the rubber composition to the inside of tires may form a boundary between rubbers due to a significant difference in composition from nearby rubbers, which may cause initial cracking at the corresponding portion.

In addition, in order to increase the recognition distance, a method of replacing a chip applied to the inside of an RFID tag with a high-priced high-performance chip may be used, but this method is inefficient due to a high cost increase.

Therefore, research into a rubber composition which is similar to physical properties of a nearby rubber, protects an RFID tag, and provides shielding and insulating effects, while minimizing an increase in cost, when applied to the inside of tires, is required.

SUMMARY

An aspect of the present disclosure may provide a tire including a RFID system in which the RFID system is covered with a rubber similar to a nearby rubber to suppress generation of a boundary therebetween, to thereby lower a possibility of the occurrence of initial cracking at a portion where the RFID system is applied, increasing durability and safety, and insulating properties of the rubber covering the RFID system are enhanced to increase a recognition distance of the RFID system to further facilitate management of distribution and history.

According to an aspect of the present disclosure, a tire includes: a radio frequency identification (RFID) system; and a rubber patch including a topping rubber topping the RFID system, wherein the topping rubber includes a raw material rubber and a reinforcing filler including a boron nitride.

The topping rubber may include 10 parts by weight to 40 parts by weight of the boron nitride with respect to 100 parts by weight of the raw material rubber.

The reinforcing filler may further include 10 parts by weight to 40 parts by weight of any one selected from the group consisting of carbon black, silica, and a mixture thereof with respect to 100 parts by weight of the raw material rubber.

The boron nitride may be a hexagonal boron nitride.

The rubber patch may be positioned outside a bead filler.

The rubber patch may be positioned between an upper bead filler and a rim cushion.

In the tire including a RFID system according to the present disclosure, since the RFID system is covered with a rubber similar to a nearby rubber, formation of a boundary therebetween is suppressed to lower a possibility of the occurrence of initial cracking at a portion where the RFID system is applied, thus increasing durability and safety, since insulating properties of the rubber covering the RFID system are enhanced, a recognition distance of the RFID system is increased to further facilitate management of distribution and history.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described in detail so that those skilled in the art may easily carry out the present disclosure. The present disclosure may, however, be embodied in many different forms and should not be construed as limited to the embodiments set forth herein.

A tire according to an embodiment of the present disclosure includes a radio frequency identification (RFID) system and a rubber patch including a topping rubber for topping the RFID system.

Figure 1:
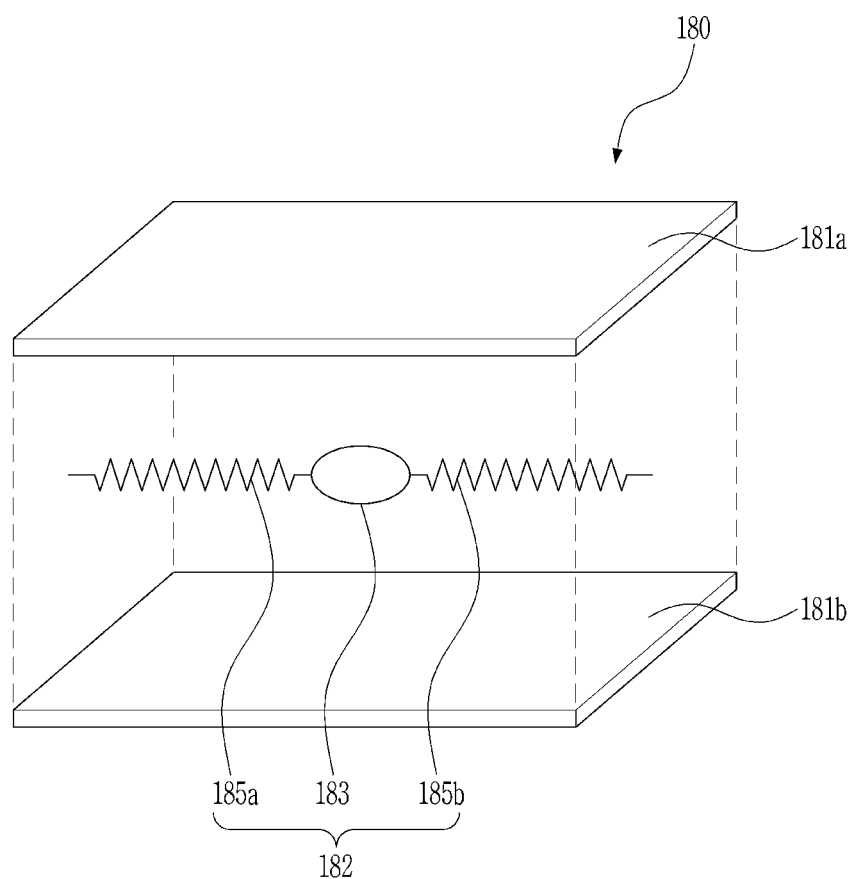
FIG. 1 is an exploded perspective view of a rubber patch.

FIG. 1 is an exploded perspective view of a rubber patch.

Referring to FIG. 1, the rubber patch 180 includes an RFID system 182 and topping rubbers 181a and 181b.

The RFID system 182 may be an RFID tag including a passive RFID transponder 183 and a pair of antennas 185a and 185b forming a dipole.

The RFID system 182 may be topped, i.e., covered, coated, or embedded by the topping rubbers 181a and 181b. Although it is illustrated that both sides of the RFID system 182 are topped with the topping rubbers 181a and 181b, but the present disclosure is not limited thereto and only one side of the RFID system 182 may be topped with the topping rubbers 181a and 181b.

The rubber patch 180 may be manufactured by disposing the topping rubbers 181a and 181b on both sides of the RFID system 182 and subsequently rolling and cutting the same.

The topping rubbers 181a and 181b include raw material rubber and a reinforcing filler.

As raw material rubber of the topping rubbers 181a and 181b, a rubber composition similar to a raw material rubber applied to the periphery thereof may be used according to application positions of the rubber patch 180. That is, when the RFID system 182 is applied, the RFID system 182 is covered with a rubber similar to the nearby rubber to suppress generation of a boundary between the rubber and the rubber, whereby the occurrence of initial cracking at a portion where the RFID system 182 is applied may be lowered to increase durability and safety.

Therefore, the kind of the raw material rubber is not limited in the present disclosure, and rubber generally used for tires, for example, natural rubber (NR), polyisoprene rubber (IR), various butadiene rubbers (BR), various styrene butadiene copolymer rubber (SBR), acrylonitrile butadiene copolymer rubber (NBR), chloroprene-based rubber, ethylene propylenediene copolymer rubber, styrene isoprene copolymer rubber, styrene isoprene butadiene copolymer rubber, isoprene butadiene copolymer rubber, and the like, may be used.

Meanwhile, the reinforcing filler may include a boron nitride. The reinforcing filler may further include any one of reinforcing fillers selected from the group consisting of carbon black, silica, and a mixture thereof in addition to the boron nitride.

In the present disclosure, in the topping rubbers 181a and 181b topping the RFID system 182, the content of the reinforcing filler such as carbon black is reduced and the boron nitride, instead of silica, is applied, thereby eliminating generation of a boundary between the rubbers, when applied to a tire of carbon black.

Further, since the topping rubbers 181a and 181b have the above-described composition, a dynamic modulus is high and permittivity is low, protecting the RFID system 182 and obtaining shielding and insulating effects.

Specifically, an electric insulation effect of the topping rubbers 181a and 181b is enhanced by reducing the content of carbon black having low electric insulating properties to a half, compared with existing rubber, and adding a boron nitride having excellent insulating performance, and reinforcing characteristics of the topping rubbers 181a and 181b are maintained by increasing the content of boron nitride by the reduced amount of the content of carbon black. In order to maximize the effect, the boron nitride may be a hexagonal boron nitride.

Also, by preventing direct contact with nearby metal (carcass, steel cord) and moisture, while topping the periphery of the RFID system 182 with the topping rubbers 181a and 181b, disturbing factors of the recognition distance of the RFID system 182 may be minimized.

Thus, the topping rubbers 181a and 181b may include a boron nitride in an amount of 10 parts by weight to 40 parts by weight with respect to 100 parts by weight of the raw material rubber, and, specifically, 10 parts by weight to 20 parts by weight. If the content of boron nitride is less than 10 parts by weight based on 100 parts by weight of the raw material rubber, the effect of adding the boron nitride may be small, and if the content exceeds 40 parts by weight, there may be a difference in color from the rubber composition not including the boron nitride or insulation properties may be lowered again.

The reinforcing filler may include any one selected from the group consisting of carbon black, silica, and a mixture thereof in an amount of 10 parts by weight to 40 parts by weight based on 100 parts by weight of the raw material rubber, and, specifically, 10 parts by weight to 20 parts by weight. If the content of any one selected from the group consisting of carbon black, silica, and a mixture thereof is less than 10 parts by weight based on 100 parts by weight of the raw material rubber, the effect of adding the boron nitride may be small, and if the content exceeds 40 parts by weight, there may be a difference in color from the rubber composition to which the boron nitride is not added or the insulating properties may rather be lowered again.

The topping rubbers 181a and 181b may be prepared by preparing a rubber composition by mixing various compounding agents mixed to a rubber composition for a tire together with the raw material rubber and the reinforcing filler and vulcanizing or cross-linking the same. The compounding agents may include, for example, a vulcanizing or cross-linking agent, vulcanizing or cross-linking promoter, an anti-oxidant, a filler, a plasticizer, and the like. A compounding amount of the compounding agent may be a general compounding amount of the related art, as long as it is not contrary to the object of the present disclosure.

Meanwhile, since the RFID system 182 is formed of a material such as plastic or a metal, fluidity is very small, and thus, it is advantageous to arrange the RFID system 182 at a place where movement is the least in the tire. Accordingly, the rubber patch 180 may be located outside a bead filler of the tire, and specifically, may be positioned between an upper bead filler and a rim cushion with least movement inside the tire by reflecting the characteristics of the RFID system 182 with very low fluidity.

Figure 2:
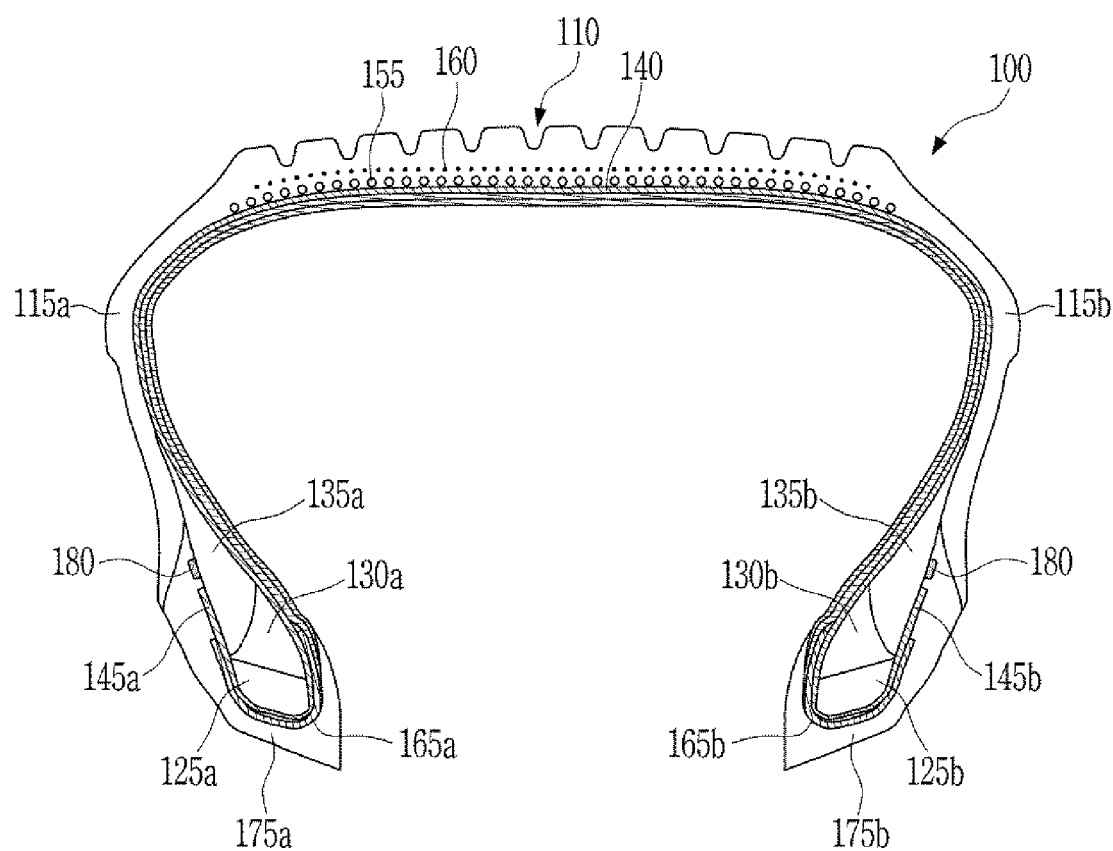
FIG. 2 is a cross-sectional view of a tire according to an embodiment of the present disclosure.
Figure 3:
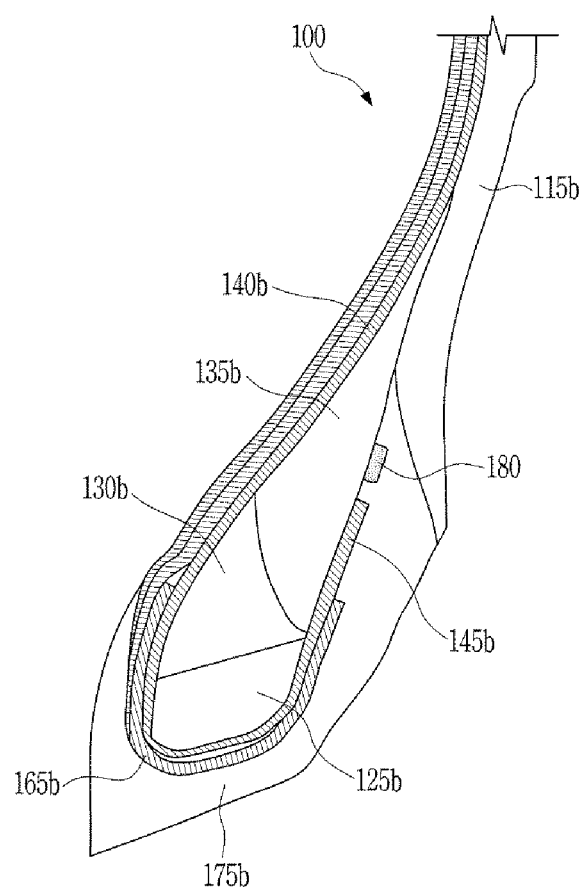
FIG. 3 is a cross-sectional view of the bead region of the tire of FIG. 2.

FIG. 2 is a cross-sectional view of a tire according to an embodiment of the present disclosure, and FIG. 3 is a cross-sectional view of a bead region of the tire of FIG. 2.

Referring to FIG. 2, a tire 100 includes a circumferential tread 110 and a pair of side walls 115a and 115b including a first sidewall 115a and a second sidewall 115b. The first side wall 115a extends from a first bead region to the circumferential tread 110. Similarly, the second side wall 115b extends from a second bead region to the circumferential tread 110. Each bead region includes beads 125a and 125b and bead fillers 130a and 130b respectively including upper bead fillers 135a and 135b.

The tire 100 may further include a body ply 140 extending from the first bead region to the second bead region.

Although a single body ply 140 is illustrated in FIG. 2, two or more body plies may be employed. The body ply 140 surrounds each of the beads 125a and 125b to thereby form a first turn-up portion 145a and a second turn-up portion 145b.

In FIG. 2, the tire 100 may further include a belt 155 and a cap ply 160, and here, the tire 100 may include two or more belts 155 and cap plies 160.

The tire 100 may further include a first wire reinforcement 165a in the first bead region and a second wire reinforcement 165b in the second bead region. The wire reinforcements 165a and 165b surround the beads 125a and 125b, the bead fillers 130a and 130b, and portions of the body fly 140, respectively. The wire reinforcements 165a and 165b may provide structural reinforcement for the tire 100 or may protect the body ply 140 from wear.

The tire 100 also includes a pair of rim cushions 175a and 175b including a first rim cushion 175a and a second rim cushion 175b. The rim cushions 175a and 175b are located outside the wire reinforcements 165a and 165b, surround the beads 125a and 125b, and extend to upper portions of turn-up end portions of the turn-up portions 145a and 145b of the body fly 140 in a radial direction, i.e., to outer sides of the upper bead fillers 135a and 135b, respectively.

The rubber patch 180 may be located outside the bead fillers 130a and 130b. Specifically, in FIG. 3, the rubber patch 180 is illustrated to be positioned between the upper bead fillers 135a and 135b and the rim cushions 175a and 175b. However, the present disclosure is not limited thereto, and the rubber patch 180 may also be positioned between the upper bead fillers 135a and 135b and the turn-up portions 145a and 145b and between the upper bead fillers 135a and 135b and the side walls 115a and 115b.

Hereinafter, an embodiment of the present disclosure will be described in detail such that those skilled in the art may easily carry out the present disclosure. The present disclosure may, however, be embodied in many different forms and should not be construed as being limited to the embodiment set forth herein.

PREPARATION EXAMPLE: PREPARATION OF TOPPING RUBBER

Inventive Example and Comparative Example

A topping rubber for a TBR tire was prepared using rubber compositions of Inventive Examples and Comparative Example having the compositions illustrated in Table 1 below.

Also, in addition to the compounding agents of Table 1 below, 2 parts by weight of process oil, 5 parts by weight of zinc oxide, 2 parts by weight of stearic acid, 3.5 parts by weight of an antioxidant, 0.5 parts by weight of a vulcanization accelerator, 2.25 parts by weight of sulfur, and 0.2 parts by weight of an accelerator, which are generally used in rubber compositions for TBR tire bead fillers, were mixed with 100 parts by weight of NR as raw material rubber.

Specifically, Comparative Example 1 is a case where a hexagonal boron nitride (HBN) was not added, and Inventive Example 1 and Inventive Example 2 are cases where HBN was added and types of carbon black thereof were different. That is, in Inventive Example 1, 20 parts by weight of HBN and 20 parts by weight of N330 carbon black were added to 100 parts by weight of the raw material rubber, and in Example 2, 20 parts by weight of N660 carbon black, instead of N330 carbon black of Inventive Example 1, was added.

Comparative Example 1 had the same composition as that of a rubber composition for a bead filler. Thus, as a composition is similar to that of Comparative Example 1, a probability of generating a boundary between rubbers is reduced, and thus, Inventive Example 1 has a probability of generating a boundary between rubbers, lower than that of Inventive Example 2.

TABLE 1

|  | Inventive Example 1 | Inventive Example 2 | Comparative Example 1 |
|---|---|---|---|
| NR[1] | 100 | 100 | 100 |
| HBN[2] | 20 | 20 | 0 |
| N330[3] | 20 | 0 | 40 |
| N660[4] | 0 | 20 | 0 |

[1] Raw material rubber: NR (TSR-20, Southland Rubber CO., LTD)
[2] Boron nitride: HBN (Unitech Corporation)
[3] Carbon black: HAF N330 (Korea Carbon)
[4] Carbon black: GPF N660 (Korea Carbon)

Experimental Example 1: Evaluation Result of Rubber Sample

The results of various evaluations of the rubber samples prepared in Inventive Examples 1 and 2 and Comparative Example 1 are illustrated in Table 2 and Table 3, and measurement methods are as follows.

(1) Tensile properties: Measured using an Instron tester according to the ASTM D412 test method.

TABLE 2

| Physical Properties | International Standard Reference Value | Inventive Example 1 |
|---|---|---|
| Tensile Strength | ≥0.79 kgf/cm$^2$ | 260.60 kgf/cm$^2$ |
| 10% Modulus | ≥2.93 kgf/cm$^2$ | 4.25 kgf/cm$^2$ |
| Elongation | ≥655% | 697% |
| Electrical Conductivity | ≤0.2 Ω/m | 30 Ω/M or higher |

TABLE 3

| Item | | Inventive Example 1 | Inventive Example 2 | Comparative Example 1 |
|---|---|---|---|---|
| Tensile Properties | Hardness | 55 | 55 | 55 |
| | 10% Modulus | 4.3 | 4.3 | 3.8 |
| | Tensile Strength | 300 | 309 | 301 |
| | Elongation (%) | 697 | 688 | 642 |
| Electrical Conductivity | Ω/M | 30 GΩ/M or higher | 30 GΩ/M or higher | 218 Ω/M |

As illustrated in Table 3 above, Inventive Example 1 and Inventive Example 2, in which the content of carbon black was reduced and HBN was applied, have 10% of modulus and a similar level in terms of hardness, as compared to Comparative Example 1. In addition, in the case of elongation, Inventive Example 1 and Inventive Example 2, to which HBN, instead of carbon black, was applied, have dynamic modulus higher than that of Comparative Example 1, achieving a value equal to or higher than a reference value.

Further, as a result of measuring electrical conductivity, in the case of Comparative Example 1, conduction was smoothly made and no insulation effect was generated, but, in Inventive Example 1 and Inventive Example 2, a resistance value exceeded 30 GΩ/It, which exceeded a maximum measurable range of the instrument, exhibiting an insulation effect. This resulted from the reduction in the content of carbon black which does not have an insulation effect and the addition of HBN with good insulating properties by the reduced content of carbon black.

Experimental Example 2: Evaluation of Recognition Distance

An RFID tag was topped with the rubber sample of Inventive Example 1 to prepare a rubber patch, and the rubber patch was applied between an upper bead filler and a rim cushion where movement is small to manufacture a tire. Accordingly, a recognition distance was measured and results thereof are illustrated in Table 4 below.

TABLE 4

| TBR Standard | Application of topping rubber | Average recognition distance [mm] |
|---|---|---|
| 11R22.5 | X | 30.7 |
|  | ◯ | 38.1 |

The results of Table 4 show that the recognition distance increases by about 24% when the rubber sample having the insulating effect was applied. This is because the influence of a metal component that affects the recognition distance was reduced to prevent a decrease in reception sensitivity of the RFID tag.

It will become apparent to a person of ordinary skill in the art that the present disclosure may be embodied in different specific forms without deviating from essential features of the present disclosure. Therefore, it should be considered that the detailed description is not to limit the present disclosure but to illustrate it. Thus, it is intended that the present disclosure cover the modifications and variations of this invention provided they come within the scope of the appended claims and their equivalents.

What is claimed is:

1. A tire comprising:
a circumferential tread;
at least one bead region respectively having a bead and an upper bead filler;
at least one side wall respectively extending from the upper bead filler of the at least one bead region to the circumferential tread;
at least one body ply respectively surrounding the bead of the at least one bead region to form a turn-up portion in the at least one bead region;
at least one rim cushion respectively located outside the bead of the at least one bead region, surrounding the bead of the at least one bead region, and extending from an upper portion of a turn-up end portion of the turn-up portion of the body ply of the at least one bead region in a radial direction, to an outer side of the upper bead filler of the at least one bead region; and
a rubber patch including a radio frequency identification (RFID) system and a topping rubber topping the RFID system;
wherein the upper bead filler contacts the turn-up end portion of the body ply, the rim cushion and the side wall of the at least one bead region,
wherein the rubber patch is positioned between the upper portion of the turn-up end portion in a radial direction and a lower portion of the side wall in a radial direction of the at least one bead region, and between the upper bead filler and the rim cushion of the at least one bead region,
wherein the topping rubber includes a raw material rubber and a reinforcing filler including both boron nitride and carbon black, and
wherein the boron nitride is a hexagonal boron nitride.

2. The tire of claim 1, wherein
the topping rubber includes 10 parts by weight to 40 parts by weight of the boron nitride with respect to 100 parts by weight of the raw material rubber.

3. The tire of claim 1, wherein
the reinforcing filler further includes 10 parts by weight to 40 parts by weight of any one selected from the group consisting of the carbon black, silica, and a mixture thereof with respect to 100 parts by weight of the raw material rubber.

* * * * *